Figure 1:
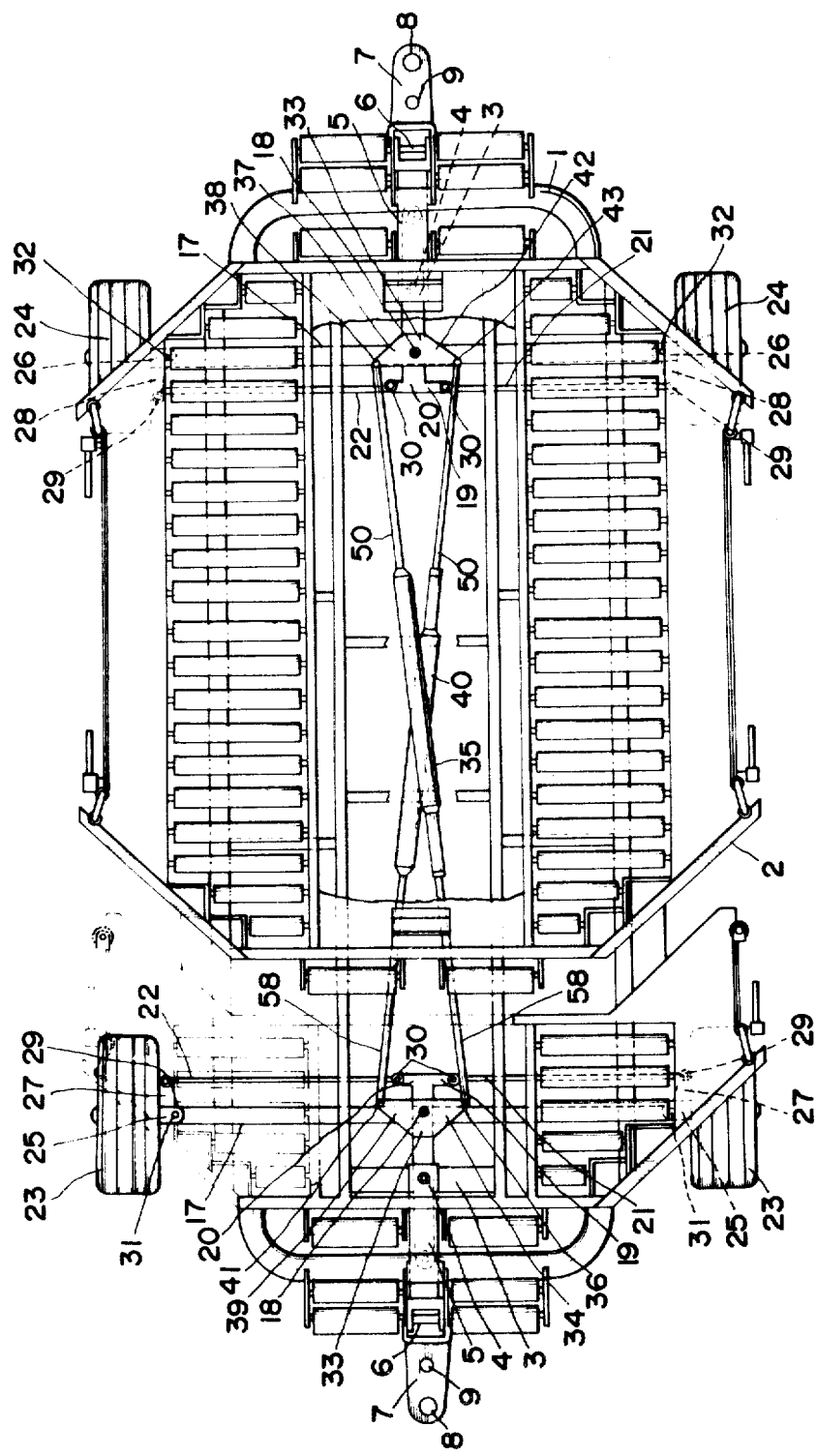

United States Patent
Yokoyama

[11] 3,905,620
[45] Sept. 16, 1975

[54] TRAILERS
[75] Inventor: Masato Yokoyama, Osaka, Japan
[73] Assignee: Kabushiki Kaisha Suehiro Sharyo Seisakusho, Osaka, Japan
[22] Filed: Dec. 7, 1973
[21] Appl. No.: 422,980

[30] Foreign Application Priority Data
Dec. 15, 1972 Japan............................ 47-144692

[52] U.S. Cl. ............................... 280/419; 280/102
[51] Int. Cl.² ..................... B60D 3/00; B62D 13/04
[58] Field of Search ....... 280/98, 99, 100, 101, 102, 280/408, 419, 432, 443, 442, 444, 446 R, 446 B; 267/34, 162

[56] References Cited
UNITED STATES PATENTS
| 409,298 | 8/1889 | Parker | 280/102 |
| 2,412,927 | 12/1946 | Thorn | 280/99 |
| 2,726,097 | 12/1955 | Darrough | 280/446 B |

FOREIGN PATENTS OR APPLICATIONS
| 54,471 | 5/1950 | France | 280/443 |

Primary Examiner—Leo Friaglia
Assistant Examiner—R. Schrecengost
Attorney, Agent, or Firm—Stevens, Davis, Miller & Mosher

[57] ABSTRACT

The specification discloses an automatic steering mechanism for trailers to transport goods and adapted to be connected in series and towed by a suitable vehicle. Frame of each trailer is provided with couplers at the front and the rear sides thereof. These couplers are operatively connected to respective swingable members. A pair of interlocking assemblies are provided between the swingable members so that the rotational or swinging movement of respective ones of the couplers and the swingable members may be transmitted to the other ones. Wheels in pairs are operatively connected to the swingable members by means of actuator rods so that the swinging movements of the swingable members may be transmitted to the respective pairs of wheels so as to control the running direction or angles thereof relative to the longitudinal axis of the frame in response to the swinging movements of the coupler means.

The interlocking means for use in the automatic steering mechanism is provided with a force damping means so that the transmission of the steering force between the swingable members may be effected smoothly.

1 Claim, 5 Drawing Figures

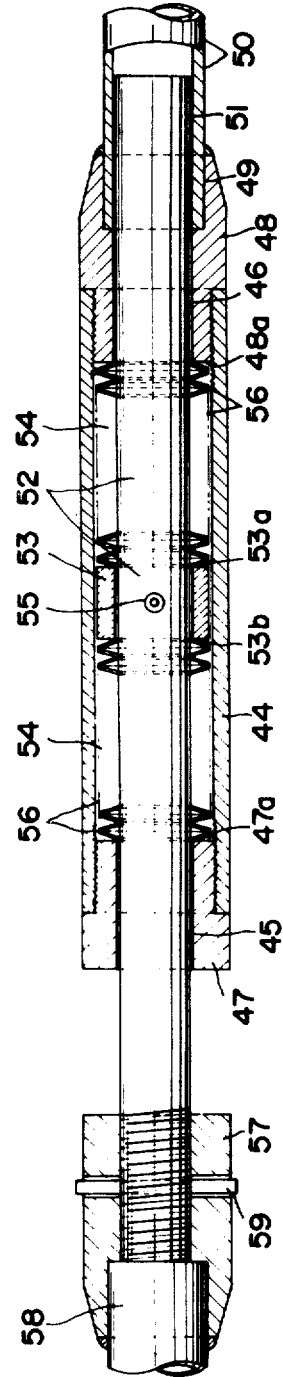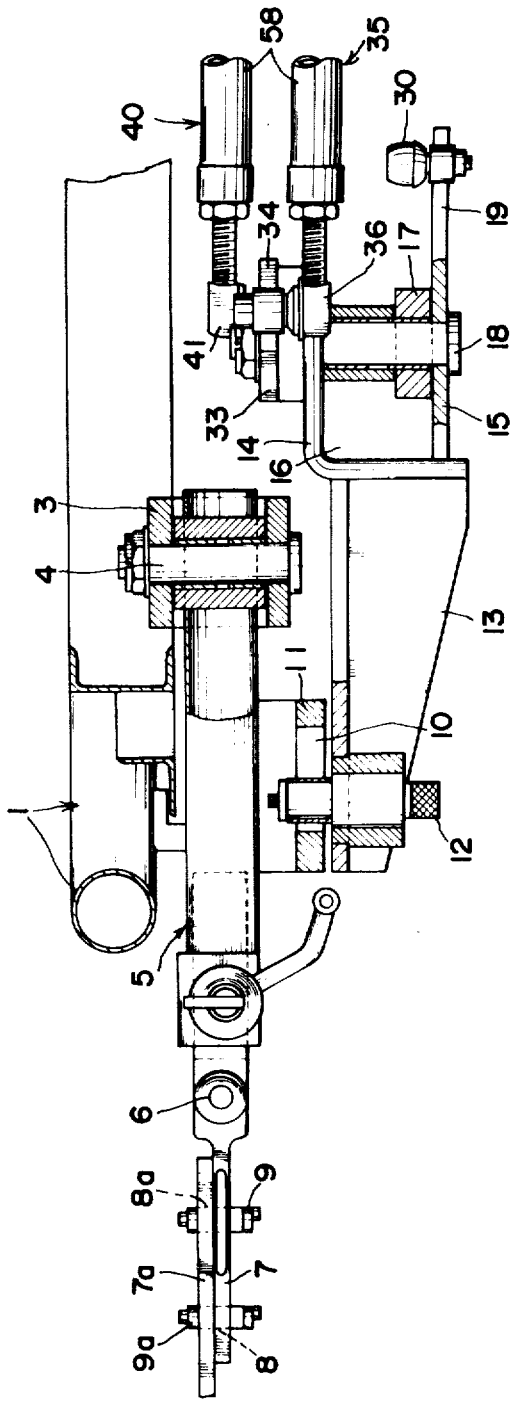

TRAILERS

The present invention relates, in general, to trailers for transporting goods or freights and, in particular, to an automatic steering apparatus for the trailers which are adapted to be connected in series with one another and towed by a power vehicle.

In the hitherto known trailer of this type, a manually operable switching apparatus is employed to manage the running direction of the individual trailers in accordance with the drive or road conditions. For example when a series or train of trailers has to be turned, every switching apparatus provided for the individual trailers must be previously so set that the desired turn will be carried out. Whenever the running direction is to be changed, it is necessary every time to perform such previous switching operations. This is troublesome and time consuming operation and incurs a remarkable reduction in the efficiency of transportation.

Furthermore, when a plurality of the conventional trailers connected to one another are driven, succeeding trailers tend not to precisely follow the path of the preceding trailers and therefore difficulties are encountered when such train of trailers is to be driven in order and in regularity.

Accordingly, an object of the present invention is to provide an improved trailer which evades the disadvantages of the conventional trailer such as above mentioned.

Another object of the present invention is to provide a trailer having an automatic steering mechanism which allows the driving of the trailer in any intended driving direction.

Still another object of the present invention is to provide a novel and improved trailer which makes it unnecessary to previously set the desired running direction each time when the driving direction is to be changed.

Other object of the present invention is to provide an automatic steering mechanism for the trailers which allows the orderly and regular running of trailers, when they are driven in a series connection.

Further object of the present invention is to provide an automatic steering mechanism which automatically makes the succeeding trailer to follow precisely the path taken by the preceding trailer.

The foregoing and other objects and features of the invention will be more apparent upon examination of the accompanying drawings and the detailed description of preferred embodiments which follow.

Figure 4:
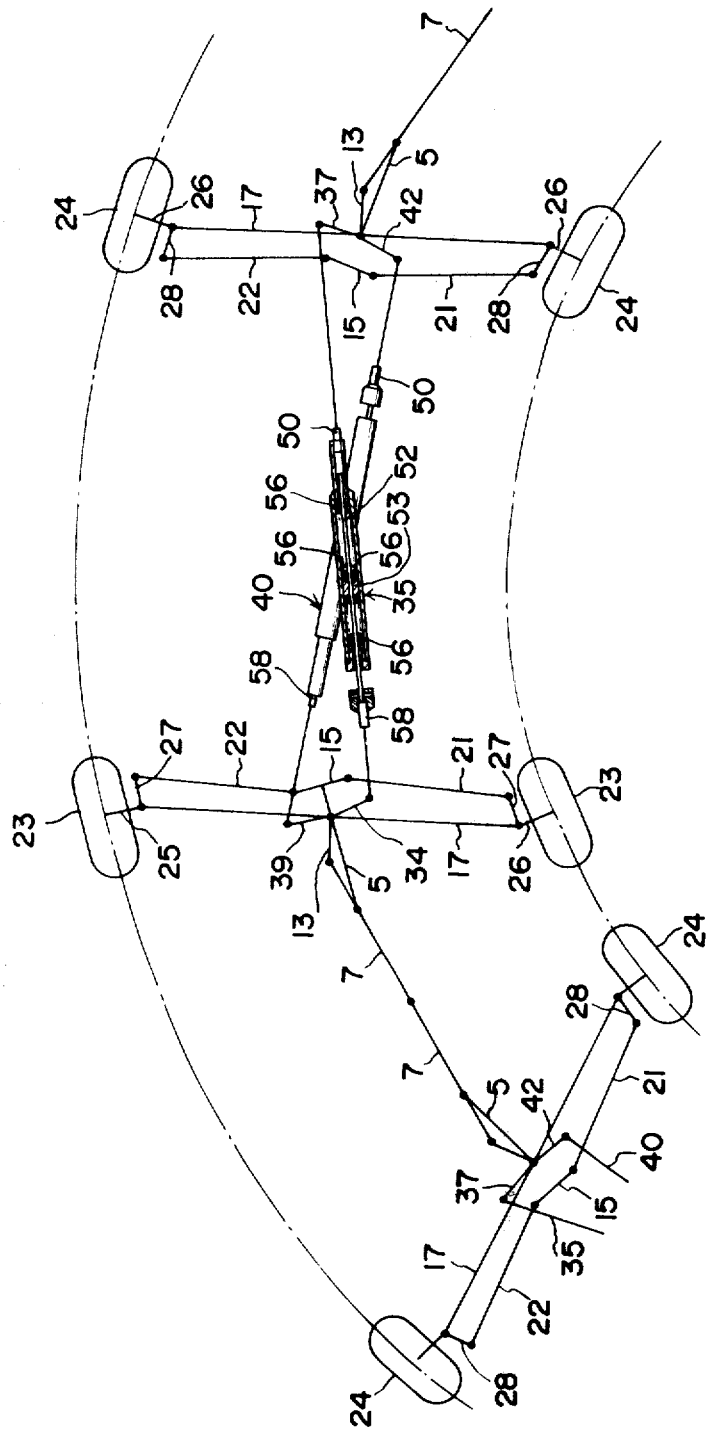
Figure 5:
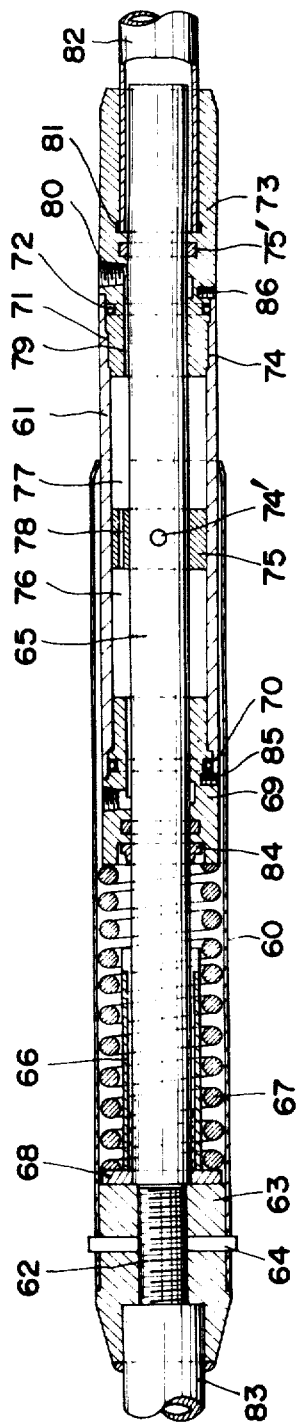

FIG. 1 shows a preferred embodiment of a trailer according to the present invention in a top plan view with portions broken away, FIG. 2 is an enlarged partial view showing a coupler portion used in the trailer shown in FIG. 1 in a vertical section, FIG. 3 shows an embodiment of an interlocking or steering rod assembly for use in the trailer shown in FIG. 1 in a partially sectioned side view, FIG. 4 is a diagram to illustrate the operation of a trailer according to the present invention, and FIG. 5 is a view similar to FIG. 3 but shows another embodiment.

Referring to the drawings, reference numeral 1 indicates a base frame of a trailer which supports rotatably a turn table 2 thereon. The turn table 2 may be of any conventional construction and composed of a plurality of rolls arrayed so as to facilitate the loading and positioning of goods or freight to be transported by the trailer as is schematically illustrated in FIG. 1. The frame 1 has coupling portions 3 fixedly secured thereto at the front and the rear end portions thereof. Each of the coupling portions 3 is of a channel-like or C-shaped configuration in cross-section and supports pivotally a coupler 5 at an inner end thereof by means of a pin 4 so that the coupler may be rotated about the pin 4 in a horizontal plane. The coupler 5 in turn supports at the outer end portion a connector plate 7 by means of a supporting shaft 6 rotatably in a vertical plane. The connector plate 7 constitutes a part of the coupler 5 and is provided with a connecting opening 8 and a protrusion 9, the dimensions of which are such that the opening 8 may engageably receive a corresponding protrusion of the connector plate 7 of another trailer. It should be appreciated that such coupler arrangements including the connector plates are present both at the front and the rear ends of the frame 1.

Referring particularly to FIG. 2, secured to the coupler 5 at the lower intermediate portion thereof is a suspending member 11 formed with an elongated slot 10, within which a supporting or suspending rod 12 is received. An arm plate 13 is horizontally swingably supported by the rod 12 at an outer end thereof and is bifurcated at the inner end into vertically aligned upper and lower plates 14 and 15 which form therebetween a bearing cavity 16. An axle 17 is disposed within the bearing cavity 16 and mounted to the bifurcated upper and lower plates 14 and 15 by means of a shaft 18 so as to be angularly movable relative to the swingable arm 13.

Referring again to FIG. 1 in connection with FIG. 2, the lower plate 15 of the swingable arm member 13 has lateral extensions 19 and 20 integrally formed at the inner end of the plate 13, to which actuator rods 21 and 22 are, respectively, pivoted by means of pins 30. The opposite ends of those actuator rods are rotatably connected to supporting arms 27 and 28, respectively, by means of pins 29, said supporting arms 27 and 28 being integrally formed with supporting members 25 and 26, respectively, for front and rear wheels 23 and 24. It is also to be noted that both ends of the axle 17 are swingably connected to the supporting members 25 and 26 by means of shafts 31 and 32, respectively.

Furthermore, the upper plates 14 of the swingable arms 13 arranged at the front and the rear sides in the same manner are provided with fan-like actuator plates 33, 33, respectively, each of which is fixed on the associated plate 13 at one side thereof. One of the actuator plates 33 is formed with an enlarged extension which serves as a link lever 34, to which one end of an expansible interlocking or steering rod assembly 35 is pivotally connected by means of a shaft 36, while the other end of the steering rod assembly 35 is connected to a corresponding fan-like link lever 37 of the other actuator plate 33 by means of a shaft 38. In the drawing, the said one actuator plate 33 is disposed at the lefthand side, while the said other actuator plate 33 is shown at the righthand side as viewed in FIG. 1. Because the pivotally supporting shafts 36 and 38 are disposed symmetrically oppositely to each other with respect to the longitudinal axis of the trailer, the steering rod assembly 35 is also disposed angularly to that longitudinal center axis and passes through substantially a central or middle portion of the trailer. It must also be pointed out that the steering or interlocking rod assembly 35 is positioned below the frame 1. Disposed symmetrically and intersecting the steering rod assembly 35 is another similar expansible interlocking or steering rod assembly 40 which is connected to the other fan-like link lever 39 of the lefthand actuator plate 33 rotatably by means of a connecting shaft 41, while the other end of the steering rod assembly 40 is swingably linked to a similar fan-like lever arm 42 of the righthand actuator plate 33 by means of a stud 43. Of course, the steering rod assembly 40 is also disposed below the frame 1 with the same angle to the longitudinal axis of the trailer as the steering rod assembly 35. In this manner, the steering rods 35 and 40 geometrically intersect each other between the actuator plates 33, 33 as viewed from the above in FIG. 1.

Next, the structure of the steering rod assemblies 35 and 40 will be described with reference to FIG. 3.

Reference numeral 44 indicates a cylindrically formed guide housing having internally threaded ends into which guides 47 and 48 are screwed. The guides 47 and 48 have, respectively, holes 45 and 46. The guide 48 has additionally a counter bore 49 into which a connecting rod 50 is fitted and fixedly secured by welding or the like means. The connecting rod 50 is also cylindrically formed and has an internal guide surface 51 which lies axially flush with that of the guide hole 46 of the guide 48.

The reference numeral 52 indicates a steering rod slidably inserted into the guide housing 44 through the guides 47 and 48 disposed at both ends of the housing 44 and by way of the connecting rod 50. A partition annulus 53 is indisplaceably mounted on the steering rod 52 by means of a pin 55 to thereby divide the cylinder chamber 44 into two rooms. Additionally, a plurality of dish-like springs 56 are disposed adjacent to one another around the steering rod 52 between the inner wall 47a of the guide 47 and the opposite surface 53b of the annulus 53 and between the inner wall 48a of the guide 48 and the opposite surface 53a of the annulus 53. The steering rod 52 is connected to another connecting rod 58 by means of a joint means 57 at the projecting end opposite to the connecting rod 50. Those connecting rods 50 and 58 are pivotally connected to the actuator plates 33, 33 of the swingable arm members 13, 13 by means of the stud shafts 36, 41, 38 and 43 as hereinbefore described. The numeral 59 indicates a pin to secure the joint 57 to the steering rod 52.

For coupling two or more trailers to one another, the connecting plate 7 of the coupler provided at the rear end of the preceding trailer is placed on or under the corresponding connecting plate 7a of the coupler 5 of the following trailer and the protrusions 9 and 9a formed in the connecting plates 7 and 7a are fitted into the openings 8 and 8a, thereby connecting together the couplers 5 of the succeeding trailers. In this manner, a desired number of trailers can be easily connected in series to one another to form a train. Of course, the foremost trailer in the train is coupled to a towing vehicle such as a tractor (not shown) by using the connecting plate 7 of the coupler 5 in the same manner. Thus, the desired number of the trailers are now in the state to be moved by a tractor running along a straight path. During the movement of the train along a straight path, the front and the rear wheels 23 and 24 of the individual trailer are maintained in a balanced condition by the cooperation of the actuator rods 21, 21 and the steering rod assemblies 35 and 40.

Next let us consider the situation in which the plurality of the trailers connected together are to be turned. In this case, the moving directions of the front and the rear wheels 23 and 24 are constantly set or positioned tangentially to a given curved path, while the axis of the supporting shaft 12 for the swingable arm member 13 as well as the connecting point on the connecting plates 7 and 7a of both the couplers 55 lie over the curved path along which the trailer has to run. This applies to all the succeeding trailers. The front and rear wheels 23 and 24 of those trailers are set to the positions in which the moving directions of those wheels lie in the tangential direction of the curved path by the operations of the two steering rod assemblies 35 and 40 connected to the swingable bodies 13, 13. In more detail, when two trailers are coupled to each other by means of the couplers 5 as well as the connecting plates 7, 7a having respective engaging holes 8 and protrusions 9, the coupler can not freely effect the swing movement in the horizontal plane. If the connected trailers are to run along a path curved to a given direction, the connected couplers 5 will follow the path of the turning movement of the preceding trailer or towing vehicle. Such swing movement or rotation of the coupler 5 caused by the turning movement of the preceding vehicle in turn brings about a corresponding rotation of the swingable arm member 13 about the vertical supporting shaft 18 provided at the front side of the succeeding or following trailer, as a result of which the front wheels 23 are caused to change the moving direction thereof so as to follow the curved path under the control of the actuator rods 21 pivotally connected to the lower plate 15 of the swingable arm member 13 as herein-before described. Additionally, because of the arrangement of the steering rod assemblies 35 and 40 each having one end pivotally connected to the actuator plate 33 fixed on the upper plate 14 of the swingable arm member 13 at the front side of the trailer and having the other end swingably connected to the swingable arm member 13 at the rear side of the vehicle in a similar manner, the moving direction of the rear wheels tend to change the moving direction correspondingly. However, since the steering rod assemblies 35 and 40 are constructed in a manner as illustrated in FIG. 3 and already described, any direct transmission of force from the front actuator plate to the rear one will not take place. More concretely, when the front actuator plate 33 is rotated due to the turning movement of the preceding vehicle, the steering rods 52 constituting the respective steering rod assemblies 35 and 40 and slidably housed within the guide housings 44 will encounter the resilient resistance of the corresponding group of the dishlike springs accommodated within the guide housing 44. In other words, these springs serve as the force absorbing damper and will prevent the force applied by the front actuator plate 33 to the associated connecting rods 52 from being directly transmitted to the rear actuator plates 33, and additionally inhibit the counter action of the rear actuator plate from being directly fed back to the front actuator plate, thereby effectively suppressing any possible vibrations in the steering interlocking mechanism. In this way, the rear wheels will progressively and smoothly turn the moving direction to follow the turning movement of the front wheels. Since the swingable arm member 13 at the rear side of the trailer to which the axle 17 of the rear wheels 24 is pivotally connected is caused to be rotated in the horizontal plane at the same time as the turning movement of the rear wheels 24, the coupler 5 connected thereto is also correspondingly swung, which will result in the analogous rotation of the coupler 5 and hence the swingable arm member 13 of the next succeeding trailers due to the inflexible or fixed connection between the connecting plates 7 and 7a. This rotation of the swingable arm member 13 of the succeeding trailer will bring about the corresponding turning movement of the front wheels of that trailer and so forth.

In the manner, according to the present invention, the individual trailers of a train comprising a plurality of such trailers connected in series to one another will progressively follow the running path of the preceding trailer with the front wheels controlling the turning movement of the rear wheel in accordance with the steering angles determined by the preceding vehicle. In the U-like curved section as well as the L-like curved section of the running path, only the vehicle which is just running along such curved path will stepwisely comply with the turning movement of the front wheels and be positioned tangentially to the curved path and follow it without deviation. The vehicle which does not yet reach the curved section will run along the straight path and, upon entering the curved section, the vehicle now effects the turning in compliance with the curvature of the curved path under the control of the steering mechanism as above mentioned.

When all the trailers of a train are running in the one and the same curved section having a given curvature, all the front and rear wheels 23 and 24 will take the same running direction which is normal to the tangential direction of the curved path. On the other hand, when the train leaves the curved section and enters again a straight section, the coupler 5 of the foremost trailer is rotated in the direction counter to the one at the time when the train entered, and the resulting rotation of the swingable arm member 13 will cause the actuator rods 21 and 22 to return the front wheels 23 to the straightly directing positions and at the same time cause the steering rod assemblies 35 and 40 to smoothly transmit the turning movement of the said swingable arm member 13 to the rear wheels 24 under the damping action of the springs housed within the steering rod housing, to thereby make the rear wheels to progressively comply to the steering angle determined by the front wheels. The same operations occur in all the succeeding trailers having the front and rear wheels 23 and 24 interlocked to each other by means of the steering rod assemblies 35 and 34.

As is apparent from the foregoing description, each of the steering rod assemblies 35 and 34 operatively connected between the swingable arm members 13 having respective couplers 5 and provided at the front and the rear sides of the trailer incorporates therein two groups of stacked dish-like springs 56 accommodated within the respective rooms of the steering rod guide housing 44 partitioned by the fixed annulus 53. This structure allows an absorbed or damped transmission of the force between the front and the rear wheels in both directions.

FIG. 5 shows another exemplary embodiment of the steering rod or interlocking rod assembly with which the similar effect of allowing the absorbed or damped steering force transmission can be effectively attained. Referring to FIG. 5, reference numeral 60 indicates a cylinder case within which a cylinder 61 is slidably disposed. The cylinder case 60 has a connector 63 inserted into one end thereof, said connector having in turn a threaded rod 62. The connector 63 is secured to the cylinder casing 60 by means of a pin 64. A piston rod 65 inserted through the cylinder 61 is screwed into the inner end portion of the treaded rod 62 of the connector 63.

A helical spring 67 is wound around the piston rod 65 with a spring guide 66 interposed therebetween. One end of the spring 67 is latched to an enlarged portion 68 formed in the guide 66, while the other end of the helical spring 67 is engaged with cylinder head 69 at one end thereof, said cylinder head 69 being slidably mounted on the piston rod 65 and secured to the cylinder 61 at one end by way of an O-seal ring 70 disposed around the periphery of the cylinder head 69 at the other end portion thereof. The cylinder 61 has an annular offset portion 71 at the other side thereof to which a correspondingly offset portion 74 formed in a plug 73 is fitted with an O-ring 72. The piston rod 65 extends through the plug 73 fluid-tightly by using an oil seal 75'.

A piston 75 is secured to the piston rod 65 by means of a pin 74' at an intermediate position between the cylinder head 69 and the plug 73, whereby cylinder chambers 76 and 77 are formed at both sides of the piston 75. The piston 75 has a passage 78 formed therethrough for communicating pressure medium or hydraulic fluid between the chambers 76 and 77.

Furthermore, the plug 73 has a channel or groove 79 communicating to the cylinder chamber 77 as well as an oil inlet port 80 for said channel 79. The plug 73 is additionally formed with a hollow bore 81. The connecting rods 82 and 83 which are pivotally connected to the respective swingable arm members provided at the front and the rear sides of the trailer are secured to the hollow counter bore 81 and the threaded rod 62 of the connector 63. Reference numeral 84 indicates a dust seal, 85 denotes a pin which serves to prevent the relative rotation between the cylinder 61 and the cylinder head 69. The numeral 86 represents a pin to set the plug 73 to the cylinder 61.

A pair of the interlocking or steering rod assemblies each having the structure as above mentioned and illustrated in FIG. 5 are connected to the swingable arm members 13 in the same manner as is in the case of the steering rod assemblies 35 and 40. With the interlocking assemblies of the above structure, the direct or undamped force transmission between the swingable arm members 13 are effectively prevented. More specifically, upon transmission of force, the cylinder 61 has to be moved against the influence of the spring 67 as guided by the piston rod 65. Additionally, hydraulic medium or oil has to flow from the cylinder chamber 77 into the other chamber 76 through the passage 78 formed in the piston 75. In this manner, a braking or damping action is applied to the force transmission between the front and the rear swingable arm members 13, whereby the rear wheels may be progressively set to a steering angle in response to the turning movement of the front wheels and follow the path taken by the latter.

The advantages of the invention reside in the fact that the running or moving direction of many trailers each provided with the inventive automatic steering mechanism and connected in series to one another can be automatically determined by a towing vehicle without requiring any artificial control, steering or switching operations for the individual trailers with the running angle of the front wheels being readily transmitted to the rear wheels. As a result, a smooth and orderly transport running of a train of the trailers is possible without need of using any switching apparatus as in the case of the hitherto known trailers, whereby the efficiency in the transportation can be remarkably improved. The succeeding trailers can precisely follow the path taken by the preceding trailers and this allows a long connection of many trailers to run in order and in regularity all along an arbitrarily preselected path. In addition, by using the interlocking or steering rod assemblies of the structures as taught by the present invention wherein damping means such as spring or hydraulic fluids or combination thereof are employed, a smooth and reliable steering force transmission can be effected between the front wheels and the rear wheels. Another advantage is that the automatic steering mechanism is very rugged and simple in the construction, reliable in the operation and inexpensive in the manufacturing.

While the invention has been described with reference to preferable embodiments illustrated only by way of example in the drawing, it should be apparent to those skilled in the art that many and various modifications may be made in the form of the invention without departing from the spirit and the scope of the invention.

What is claimed is:

1. A trailer comprising in combination:
a frame,
front wheels and rear wheels on said frame,
coupler means mounted on said frame at the front end portion and the rear end portion thereof,
swingable members each rotatably connected, at one end portion thereof, to a mid portion of a respective one of said coupler means,
a pair of interlocking means, one end of each interlocking means being pivotally connected to the other end portion of one of said swingable members with the one end of one of said interlocking means being connected to one lateral side and the one end of the other one of said interlocking means being connected to the other lateral side of the other end portion of said one swingable member, and the other end of each of said interlocking means being pivotally connected to the other end portion of the other one of said swingable members with the other end of each of said interlocking means being connected to the lateral side, of the other end portion of the other one of said swingable members, which is opposite to the lateral side to which its respective one end is connected to the other end portion of said one swingable member,
actuator rod means connected to said swingable members to steer said front wheels and said rear wheels, and
said interlocking means each comprise a cylindrical casing, a cylinder slidably disposed in said cylindrical casing, said cylinder having a cylinder head at one end thereof, a piston rod extending through the cylinder and fixed at one end thereof to one end of said cylindrical casing, a helical spring extending around said piston rod in said cylindrical casing, a piston secured to said piston rod, said piston dividing said cylinder into two cylinder chambers, means defining a fluid passage in said piston for fluidly communicating said two cylinder chambers, a plug secured fluid-tightly to one of said cylinder chambers, said plug having means defining an oil inlet port therein, said plug further having means defining a groove therein to thereby communicate said one cylinder chamber with said oil inlet port.

* * * * *